United States Patent
Jolk et al.

(10) Patent No.: US 10,697,351 B2
(45) Date of Patent: Jun. 30, 2020

(54) APPARATUS FOR CONTROLLING THE TEMPERATURE OF A VEHICLE COMPONENT USING AN ANTI-ICING UNBLOCKING UNIT

(71) Applicant: FORD GLOBAL TECHNOLOGIES, LLC, Dearborn, MI (US)

(72) Inventors: Christian Jolk, Cologne (DE); Johann Wegers, Köln (DE); Helmut Hoyer, Königswinter (DE); Thomas Nitsche, Neuss (DE); Bernd Brinkmann, Dormagen (DE)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 16/253,033

(22) Filed: Jan. 21, 2019

(65) Prior Publication Data

US 2019/0226386 A1 Jul. 25, 2019

(30) Foreign Application Priority Data

Jan. 22, 2018 (DE) .................. 10 2018 200 934

(51) Int. Cl.
*F01P 11/20* (2006.01)
*B60K 11/08* (2006.01)
*F01P 7/12* (2006.01)

(52) U.S. Cl.
CPC ............. *F01P 11/20* (2013.01); *B60K 11/085* (2013.01); *F01P 7/12* (2013.01)

(58) Field of Classification Search
CPC ... F01P 11/20; F01P 11/14; F01P 7/12; B60K 11/085; B60K 11/08; B60K 11/02; B60K 11/04

USPC ............................. 180/68.1, 68.2, 68.3, 68.4
See application file for complete search history.

(56) References Cited

U.S. PATENT DOCUMENTS

| | | | |
|---|---|---|---|
| 7,166,819 B2 * | 1/2007 | Winter | B60S 1/0848 219/202 |
| 7,783,400 B1 * | 8/2010 | Zimler | B60S 1/0866 219/202 |
| 8,662,569 B2 | 3/2014 | Klop | |
| 9,103,265 B2 | 8/2015 | Okamoto | |
| 2004/0021575 A1 * | 2/2004 | Oskorep | B60S 1/026 340/601 |

(Continued)

FOREIGN PATENT DOCUMENTS

JP 2013208938 A 10/2013

OTHER PUBLICATIONS

English Machine Translation of JP2013208938A dated Oct. 10, 2013.

*Primary Examiner* — John D Walters
(74) *Attorney, Agent, or Firm* — David Coppiellie; King & Schickli, PLLC

(57) ABSTRACT

An apparatus for controlling the temperature of a vehicle component, in particular of an internal combustion engine, by way of a cooling apparatus of the vehicle using at least one moving air guide which controls a cooling air stream. The apparatus has an anti-icing unblocking unit which is designed in such a way that it can release the air guide which has been blocked by ice and/or snow, so that the slats or the like which serve as the air guide are fully operational again. To this end, the anti-icing unblocking unit is designed to melt the ice and/or the snow.

20 Claims, 6 Drawing Sheets

(56) References Cited

U.S. PATENT DOCUMENTS

Figure 1:
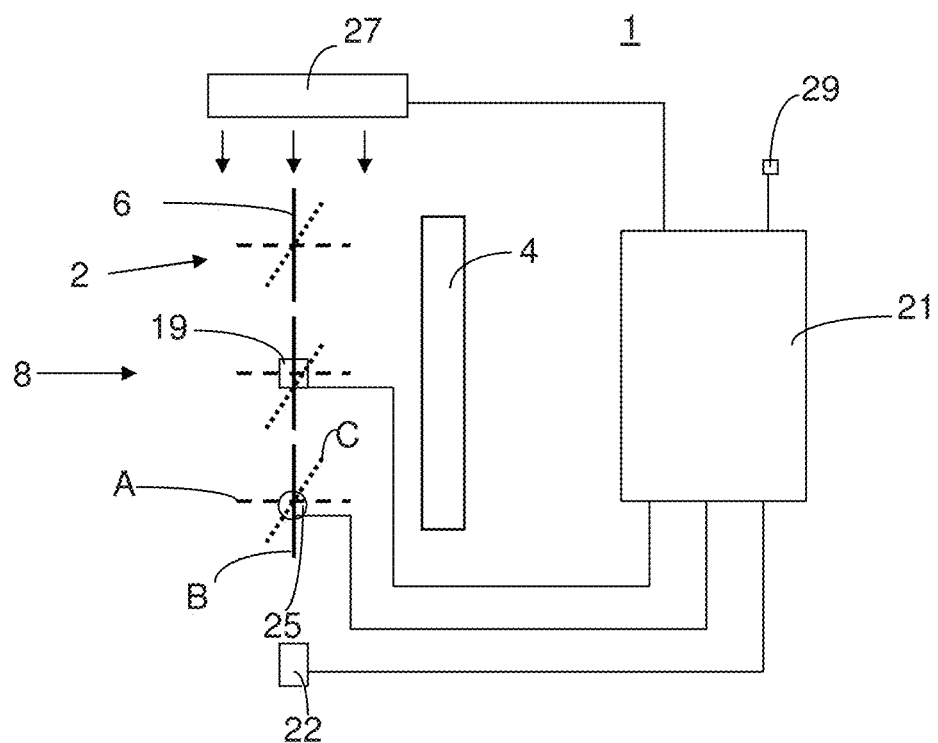

2013/0223980 A1 8/2013 Pastrick et al.
2015/0260442 A1 9/2015 Ragazzi

* cited by examiner

APPARATUS FOR CONTROLLING THE TEMPERATURE OF A VEHICLE COMPONENT USING AN ANTI-ICING UNBLOCKING UNIT

TECHNICAL FIELD

This document relates to an apparatus for controlling the temperature of a vehicle component, for example of an internal combustion engine, by way of a cooling apparatus of the vehicle having at least one moving air guide which controls a cooling air stream, using an anti-icing unblocking unit, which is designed such that it can release an air guide which has been blocked by ice and/or snow.

BACKGROUND

In modern cooling systems, closing devices such as active grill shutters are used in order to render possible different levels of air flow through a radiator. For example, at a low external temperature or during a warm-up phase of an internal combustion engine, the air flow through the engine radiator can be controlled or regulated.

In winter, closing devices comprising slats or the like can be blocked by snow and ice, this potentially causing only ineffective cooling of the internal combustion engine and therefore potentially leading to a higher consumption of fuel or, under certain circumstances, even to damage to components due to overheating.

U.S. Pat. No. 8,662,569 B2, which describes an apparatus of the generic type, proposes a solution to this problem. An adjusting motor for setting air slats which control a cooling air stream can be operated using two different electric currents. Below an external temperature threshold value with a risk of freezing, a high electric current flows through the motor with a correspondingly higher force for forced movement of the slats, even if these are iced up. Both the motor and the adjusting components of the slats and the slats themselves have to be correspondingly dimensioned for very high forces.

Another apparatus with ice identification of a cooling apparatus with slats and an external temperature sensor is known from U.S. Pat. No. 9,103,265 B2. A Hall sensor serves to detect a shutter position, so that an error signal can be output when slats are blocked. When the shutter is blocked by ice or is undesirably closed, a fan is switched on for cooling purposes, in order to prevent the engine from overheating.

US 2015/0 260 442 A1 describes a method for deicing an external region of a heat exchanger in a motor vehicle. Another method for avoiding freezing in a heat exchanger is known from JP 2013 208 938.

SUMMARY

An object of this document is to provide an improved apparatus of the generic type with reasonable structural complexity such that slats or the like, which serve as an air guide, are fully operational or can quickly be made to be operational again, even when iced up.

This object is achieved by an apparatus having the features of the following claims.

A drive motor for slats or the like and also mechanical control components must not be overdimensioned, this saving costs and weight.

Instead of attempting to move the slats with "force", the apparatus is based on the idea of eliminating the cause, specifically the ice or the snow, by melting. The cause is eliminated when the ice or the snow is soft enough that the slats can move again.

In order that firstly a proven slat controller can be employed in order to optimize motor operation and in order that secondly a check can be made in respect of whether a blocking state has been caused by an excessively low external temperature, it is expedient when the air guide is designed such that it can be adjusted by an actuator in order to control the size of at least one air inlet opening and/or the flow of the cooling air stream. Such an actuator may be connected to a control device which comprises an electrical control unit. Such a control unit may be connected to a temperature sensor for measuring an external temperature and is designed for comparison with an external temperature threshold value for providing a frost warning.

In an advantageous refinement of the solution, it is provided that an anti-icing unblocking unit is provided, which is designed in such a way that it releases a blocked air guide by virtue of an anti-freeze agent deicing process. This solution allows very rapid deicing in comparison to a melting process with a heating action because the frost-protection agent acts particularly quickly.

However, in another advantageous refinement of the solution, it is provided that an anti-icing unblocking unit is provided, which is designed in such a way that it releases the blocked air guide by virtue of the action of heat. This solution has the advantage over a melting process with a frost-protection agent that said agent does not have to be refilled, where the energy can be continuously provided by the internal combustion engine or a vehicle battery. Therefore, this solution is virtually maintenance-free.

A further advantageous embodiment of the apparatus is characterized in that the anti-icing unblocking unit comprises heating elements which release the blocked air guide by virtue of a heating-up process. Heating elements of this kind can be arranged spatially close to the cause of the problem, specifically close to the ice or to the snow, so that deicing occurs considerably more quickly. Therefore, it is expedient when the heating elements are integrated into the slats.

According to a preferred embodiment of the apparatus, the heating elements are designed as electrical heating elements. Heating wires or heating tracks can be easily installed in a cost-effective manner analogously to windshield heaters.

However, in another preferred embodiment of the apparatus, it is provided that the heating elements are designed as heating ducts through which a heating agent, which is preferably heated by the internal combustion engine, flows. The internal combustion engine provides a large amount of energy which can be used for this purpose, and therefore the battery charge can be preserved.

According to a preferred embodiment of the apparatus, a hot air stream is provided as an alternative, in particular a hot air stream which is heated by the internal combustion engine and is blown to the slats by a fan in order to deice said slats. This can be implemented in a simple manner by simply reversing the direction of a radiator fan.

In order that effective blocking detection is possible, it is advantageous to provide a blocking detection sensor for detecting a blocked state of the air guide. The sensor is preferably designed as a torque sensor. The slats can be cyclically tested to check for a blocking state, preferably only below the temperature threshold value, by being opened and closed (which in this document to also mean vice versa, that is closed and opened) by the actuator in order to detect a blocking state of the air guide. The cooling apparatus is preferably designed as a liquid radiator, in particular as a water radiator. The vehicle component to be cooled is, in particular, an internal combustion engine of a motor vehicle.

Furthermore, it may be advantageous when the control device is designed in such a way that the air guide is cyclically tested to check for a blocking state, preferably only below the temperature threshold value, by being opened and closed by the actuator in order to detect a blocking state of the air guide. As a result, it is possible to take measures for deicing the slats only when said slats are actually iced up. Therefore, deicing is not always performed when the external temperature reaches the freezing range, but rather only when actually required. A corresponding signal "Slats blocked" can also be output in order to inform the driver of this situation. A corresponding check does not have to be limited to the freezing range, but rather can also take place at higher temperatures or for different causes of a fault, such as in the case of slats which are blocked by dirt or other objects or due to a breakdown in the slat drive.

It is preferably provided that the cooling apparatus is formed as a liquid radiator, in particular as a water radiator, and the vehicle component to be cooled is an internal combustion engine of a motor vehicle. It is advantageous to check whether the external temperature lies below the external temperature threshold value. A control instruction to open the air guide can be output when the external temperature falls below an external temperature threshold value. After the control instruction to open the air guide has been output, it is possible to check whether the air guide is set in accordance with a setpoint value. If the slats are operating correctly, the check can be repeated after a certain time. If, however, setting of the air guide in accordance with the setpoint value cannot be identified, the slats are presumed to be iced up. In this case, an error signal is output or countermeasures are taken.

BRIEF DESCRIPTION OF THE DRAWING FIGURES

Figure 2:
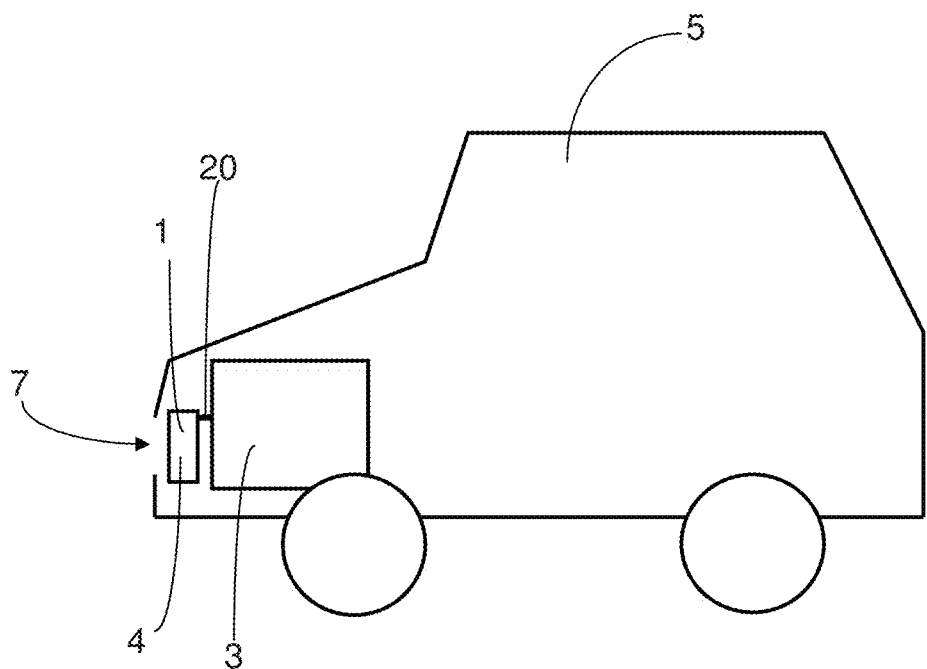
Figure 3:
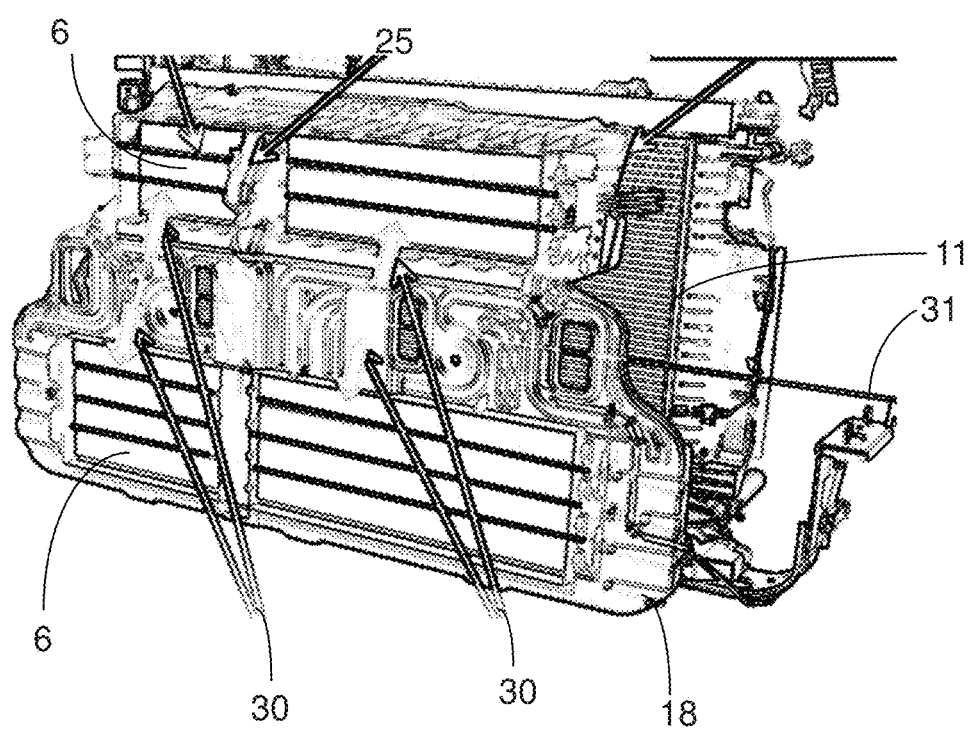
Figure 4:
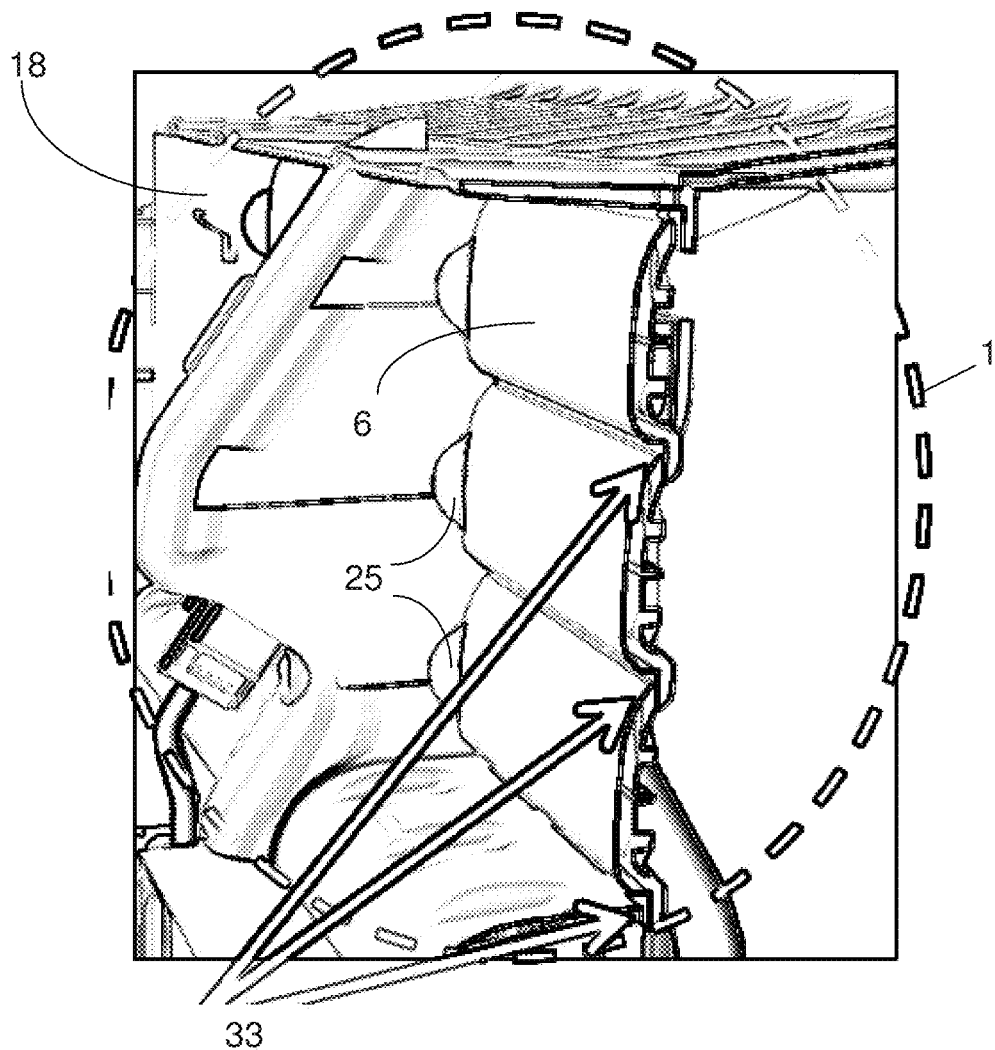
Figure 5:
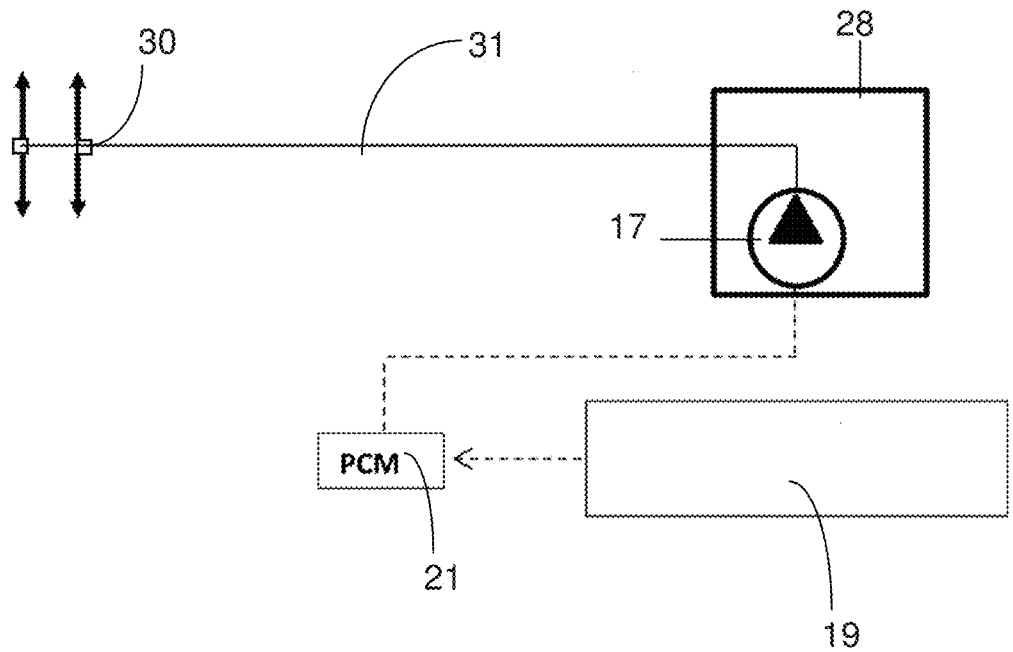
Figure 6:
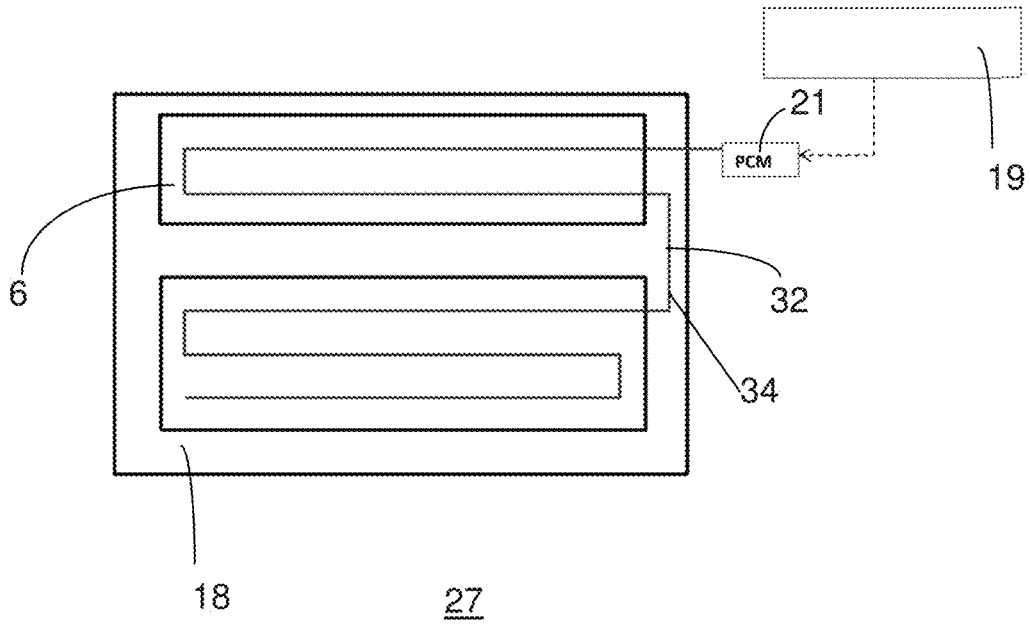
Figure 7:
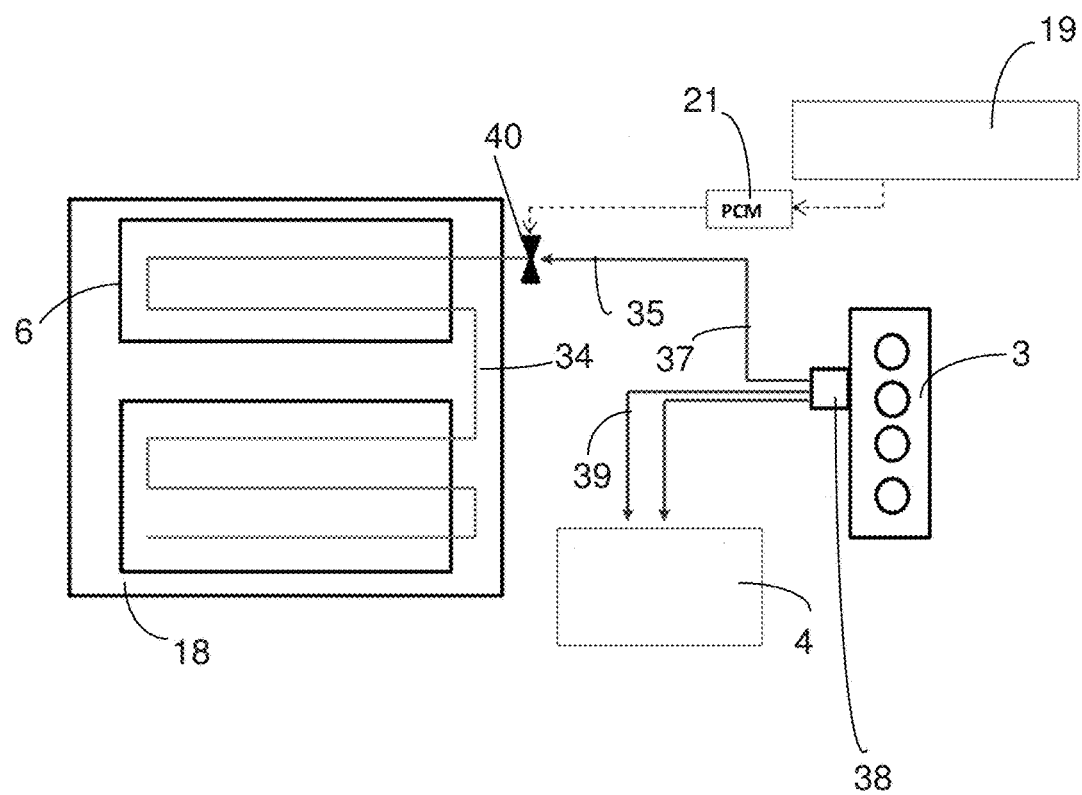
Figure 8:
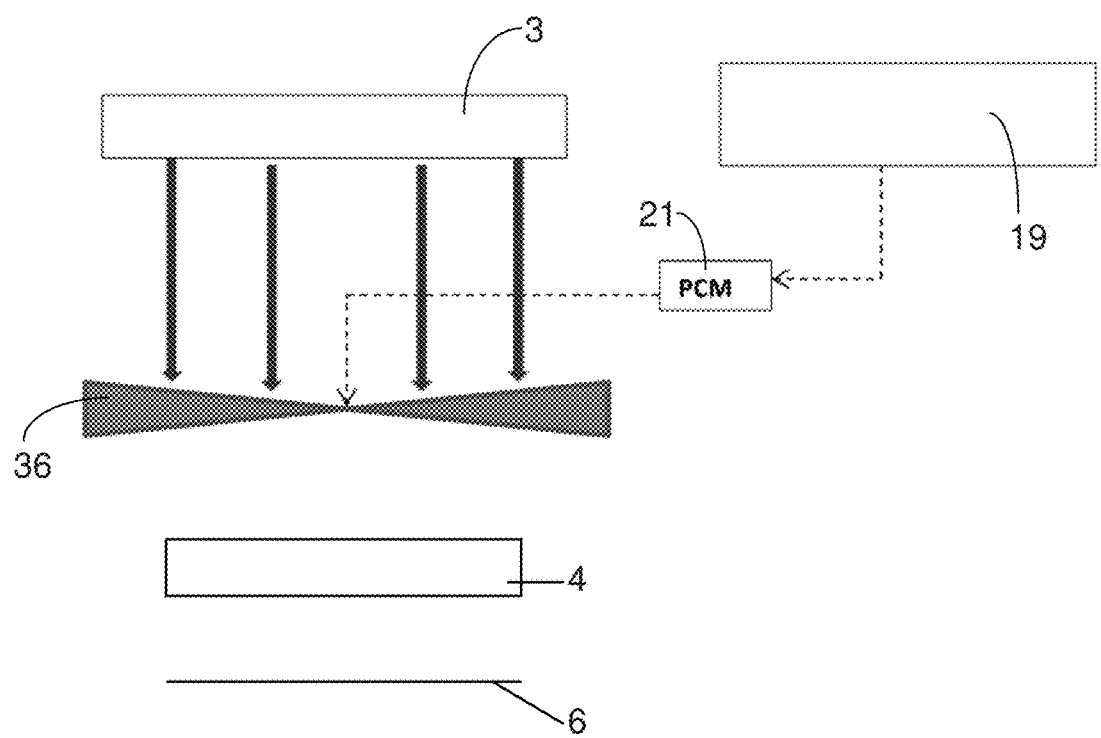
Figure 9:
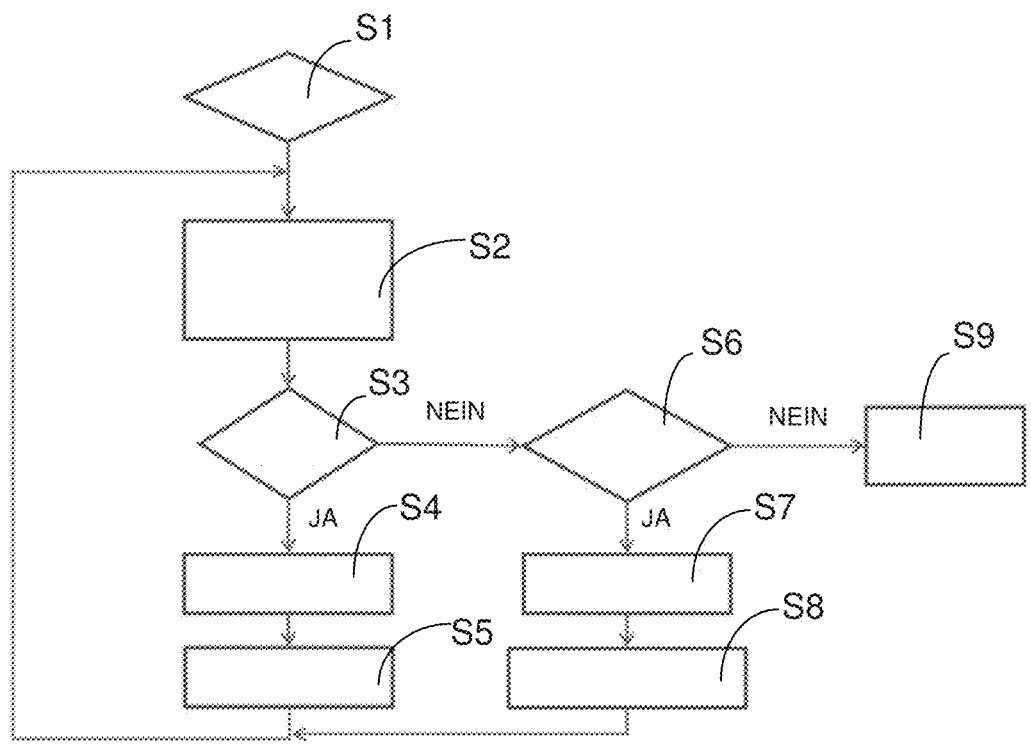
Figure 10:
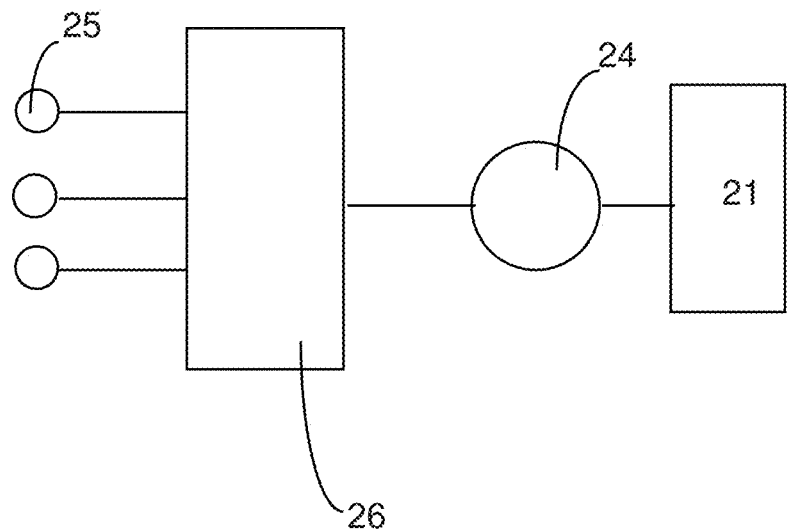

Exemplary embodiments of the apparatus will be explained in more detail below with reference to the drawings, in which:

FIG. 1 shows a schematic illustration of the new and improved apparatus,

FIG. 2 shows a schematic illustration of a motor vehicle comprising a cooling system, FIG. 3 shows a perspective illustration of a radiator comprising slats, FIG. 4 shows an enlarged perspective illustration of the slats, FIG. 5 shows a schematic illustration of a first exemplary embodiment of a deicing system for the apparatus, FIG. 6 shows a schematic illustration of a second exemplary embodiment of a deicing system for the apparatus, FIG. 7 shows a schematic illustration of a third exemplary embodiment of a deicing system for the apparatus, FIG. 8 shows a schematic illustration of a fourth exemplary embodiment of a deicing system for the apparatus, FIG. 9 shows a flowchart of a deicing checking method, and FIG. 10 shows a schematic illustration of a control device of the apparatus.

DETAILED DESCRIPTION

FIG. 1 shows an exemplary embodiment of the new and improved apparatus 1. The apparatus 1 serves to control a temperature, for example an operating temperature, of a vehicle component 3 shown in FIG. 2 which is an internal combustion engine in the exemplary embodiment. The internal combustion engine 3 is connected to a cooling apparatus 4 or to a radiator by means of a coolant line 20. The operating temperature is controlled by the cooling apparatus 4 of the vehicle 5 using a plurality of slats 6 (air guide 2) which control a cooling air stream 8 and control the size of at least one air inlet opening 7 (FIG. 2) and/or the flow of the cooling air stream 8. The slat arrangement forms a shutter.

In FIG. 1, "A" identifies a slat position at a high temperature if maximum engine cooling is required. A high level of engine cooling may be required, for example, at high ambient temperatures, in the case of a steep slope of the roadway or a high trailer load, such as when a mobile home is attached or for another goods trailer. This slat position renders it possible for the air entering the front region of the vehicle 5 to be deflected in the direction of cooling lines in the cooling apparatus 4, called only radiator for short in the text which follows.

The slats 6 are advantageously positioned in a streamlined manner, for example horizontally, at a high speed, this reducing the consumption of fuel.

In FIG. 1, "B" identifies a slat position at a low temperature when the slats are not iced up, for example in the winter or if the internal combustion engine is in the start phase and is still cold. In this case, minimal engine cooling is desired. Owing to the then minimized free space between the slats 6, an effective air inlet opening is minimized because the slats 6 are vertical.

The apparatus 1 constitutes an arrangement for a liquid radiator, in particular a water radiator, comprising cooling ducts 11 for cooling the internal combustion engine which is identified as component 3 in FIG. 2. This cooling principle can also be applied to other cooling arrangements of the vehicle or else to components of an electric vehicle. The vehicle can be a passenger car, truck, motorcycle, bus, mobile home or the like.

The slats 6 serve to control or regulate an operating temperature or an air flow or an air inflow and for temperature-, speed- and/or load-dependent cooling of the cooling water and therefore of the internal combustion engine 3 of the vehicle 5.

The slats 6 are arranged on a slat support part 18 (FIGS. 3 and 4) or a radiator grille, a radiator housing or the like.

The temperature is therefore controlled by using the slats 6 which control the cooling air stream 8 and serve as air guide 2. The slats 6 can be adjusted by an actuator 25, where said actuator is identified only on the bottom slat 6 in FIG. 1 for reasons of simplifying the drawing. The actuator 25 rotates all of the slats 6 simultaneously or synchronously. The effective passage cross section of at least the air inlet opening 7 and/or the flow of the cooling air stream can be controlled in this way.

As shown in FIG. 1, the mechanical actuator 25 is connected to a temperature-dependent control device 23 (FIG. 10). The control device 23 comprises a control unit 21 and an electric motor 24 or a comparable drive which moves all of the slats 6 at the same time by means of a gear assembly 26 or a comparable solution and is controlled by the electrical or electronic control unit 21. The control unit 21 is connected to a temperature sensor 22 for measuring an external temperature and is designed for processing an external temperature threshold value for providing a frost warning.

The actuator 25 can be a drive shaft which is connected to the electric motor 24 by means of a gear or another drive means. The actuator 25 can be integrated in the slat arrangement, as shown in FIG. 3.

A main sensor 29 for measuring the temperature of the engine 3 is connected to the control unit 21 for the purpose of controlling the slats during normal operation.

The control device 23 or the control unit 21 is designed in such a way that an only partially open air guide protection position, as identified by "C" in FIG. 1, is at least temporarily set below the external temperature threshold value for providing a frost warning.

The slats 6 are only partially open in position C, so that a sufficient gap between the slats and therefore a minimum level of air cooling are ensured in the protection position. Said gap allows cooling air to enter the radiator 4, so that the situation of a critical engine temperature being reached is avoided, even under unfavorable conditions, such as in the case of a trailer load, a slope or the like.

However, secondly, the slats 6 are partially closed in the position C, so that air cooling is considerably reduced in comparison to the position A in order to optimize operation of the internal combustion engine to be cooled. The optimum situation is when a temperature increase in the engine runs more rapidly, that is to say approximately 1.5 to four times as sharply in comparison to the position A for example, in the first minutes after the engine is started.

The control device 23 is designed in such a way that a corresponding protection position setting of the slats 6 is active in a parking mode of the vehicle 5. When the engine 3 is switched off, for example by operating an ignition key, a control instruction, which moves the slats 6 to the position C and allows them to remain there, can be made if the temperature sensor 22 outputs a temperature value of at most approximately +1° C.

As illustrated in FIG. 1, a blocking detection sensor 19 for detecting a blocked state of the slats is further provided. Said blocking detection sensor can be designed as a torque sensor. The sensor 19 measures the torque of the actuator 25 or a corresponding actuator element which can be an operating shaft or another rotatable part. An error signal is output if the torque lies above a threshold value. As an alternative, the current of the motor 24 can be measured, said current increasing when the slats are frozen. An error signal can be output if the current lies above a threshold value. The motor 24 can therefore serve as a sensor at the same time.

The apparatus is provided with an anti-icing unblocking unit 27 (FIG. 1) which is connected to the control unit 21. The anti-icing unblocking unit 27 is designed to melt the ice and/or the snow which causes the blocking. Embodiments of this unit 27 are shown in FIGS. 5 to 8. Said unit is designed in such a way that slats 6 which are blocked by ice or by snow are released by an anti-freeze agent deicing process, as shown in FIG. 5, or by a heating process, as shown in FIGS. 6 to 8.

In the variant according to FIG. 5, the unit 21 is designed as a frost-protection agent spraying unit. The unit 21 comprises a frost-protection agent container or tank 28, a pump 17 which can be integrated in the tank 28, and nozzles 30 which are directed in the direction of the slats 6, as shown in FIG. 3. The nozzles 30 are connected to a frost-protection agent line 31 which leads to the tank 28. The pump 17 is controlled by the unit 21. The tank 28 can be the wiping water tank. As an alternative, a spray can solution with a controllable pressure valve can serve for deicing purposes or another type of spraying can be selected. After the spraying operation, the blocking detection sensor 19 can be used in order to establish whether the action was successful. This process can be repeated until the slats 6 move.

As an alternative or in addition, a principle operating by heat supply according to FIGS. 6 to 8 can also be used for deicing purposes.

FIG. 6 shows a first variant of the anti-icing unblocking unit 27 comprising heating elements 32, such as heating wires 32 which are integrated in the slats 6 for example. The heating elements can be heated using current, analogously to a windshield defrosting arrangement, and are arranged at freezing points 33, preferably at the touching slat ends, as shown in FIG. 4. The current is controlled by the control unit 21.

FIG. 7 shows a solution with tubular heating elements 34 which can be heated by a—preferably liquid—heating agent 35. The radiator 4 is connected to the engine 3 by way of cooling lines 39. The coolant of the radiator 4 or a separate heating agent 35 can be provided for deicing purposes. An electric and/or hydraulic valve 40, which is connected to the control unit 21 and the supply line 37, controls the heat supply to the slats 6. The line 37 can be connected to the engine 3 or to the radiator 4. A thermostat 38, which is also connected to the line 37, is provided in this arrangement.

FIG. 8 shows a deicing principle in which a fan 36, in particular a radiator fan of the radiator 4, is used, specifically with a reversed direction of rotation. The fan 36 is arranged between the engine 3 and the slats 6. Owing to the reversal in the direction of rotation, hot engine air is blown into the slat arrangement, so that said slat arrangement can deice. As an alternative, the fan 36 can be an electric fan heater. Said electric fan heater is connected to the control unit 21.

The apparatus 1 can therefore be formed in such a way that an anti-icing unblocking unit 27 is provided which is formed in such a way that it can release the slats 6 by virtue of an anti-freeze agent deicing process (cf. FIG. 5).

The apparatus 1 can also be formed in such a way that an anti-icing unblocking unit 27 is provided, which is designed in such a way that it releases the slats 6 by virtue of the action of heat (cf. FIGS. 6 to 8).

The apparatus 1 can also be formed in such a way that the anti-icing unblocking unit 27 comprises heating elements which release the slats 6 by virtue of a heating-up process (cf. FIGS. 6 and 7).

The apparatus 1 can also be formed in such a way that the heating elements are integrated in the air guide 2 (cf. FIGS. 6 and 7).

The apparatus 1 can also be formed in such a way that the heating elements are designed as electrical heating elements (cf. FIG. 6).

The apparatus 1 can also be formed in such a way that the heating elements are designed as heating ducts through which a heating agent, which is preferably heated by the component, flows (cf. FIG. 7).

The apparatus 1 can also be formed in such a way that a heating air flow, which is heated by the engine 3, is blown by a fan 36 to the air guide 2 in order to deice the slats 6 (cf. FIG. 8).

FIG. 9 illustrates a method for cyclically testing an iced-up state of the slats 6.

The control device 23 is designed in such a way that the slats 6 are cyclically tested to check for a blocking state. This test is performed only below the temperature threshold value. An attempt is made to open and to close, or vice versa, the slats 6 by way of the actuator 25. If this is successful, the slats 6 are not iced up. However, if the slats 6 do not follow the control device, they are blocked. This can be established by the sensor 19.

In S1 in FIG. 9, measurement by the sensor 22 checks whether the temperature threshold value of +1° C. is present or undershot.

If yes, the slats 6 are then moved to the 100% position (fully open) and back to the starting position (30%) in S2.

If the test (S3) is successful, no deicing measures are initiated (S4). The test is repeated (S2) after a waiting time (S5) of x seconds.

If an error signal "Slats iced up" is output (NO in S3), a deicing measure is then initiated (S7) and, beforehand, a counter value, which counts the attempts, is compared (S6) with a maximum counter value (maximum number of attempts).

If the counter value is lower than the maximum value (YES in S6), a (repeated) deicing measure is then carried out (S7) and the counter value is increased (S8) by one. Another check (S2) is made. If the counter value reaches the maximum value, an error message "Deicing not possible" (S9) follows.

Therefore, the steps of:
checking whether the external temperature lies below the external temperature threshold value (or is equal to this threshold value),
outputting a control instruction to open the air guide when the external temperature falls below an external temperature threshold value,
checking, after the control instruction to open the air guide has been output, whether the air guide is set in accordance with a setpoint value,
when the air guide is set in accordance with a setpoint value, repeating the checking process after a defined cycle time,
when the air guide is not set in accordance with a setpoint value, repeating a deicing process until it is successful or a maximum value for attempts is reached are applied.

The apparatus 1 for controlling a temperature with an air guide protection position C is not restricted to the exemplary embodiments shown. Cooling is not restricted to an internal combustion engine. The apparatus can also be used for cooling a climate-control system or A/C component, in particular a climate-control system condenser, for battery cooling, cooling fuel cell components or the like.

What is claimed:

1. An apparatus adapted for controlling a temperature of a vehicle component by way of a cooling apparatus of the vehicle using at least one moving air guide that controls a cooling air stream wherein the at least one moving air guide may be blocked by ice and/or snow, comprising an anti-icing unblocking unit for melting the ice and/or the snow.

2. The apparatus as claimed in claim 1, wherein the air guide is adjusted by an actuator in order to control a size of at least one air inlet opening and/or the flow of the cooling air stream, where the actuator is connected to a control device that comprises an electrical control unit, where the electrical control unit is connected to a temperature sensor for measuring an external temperature and is configured for comparison with an external temperature threshold value for providing a frost warning.

3. The apparatus as claimed in claim 2, wherein the anti-icing unblocking unit releases the at least one moving air guide, when it is blocked, by virtue of an anti-freeze agent deicing process.

4. The apparatus as claimed in claim 2, wherein the anti-icing unblocking unit releases the at least one moving air guide, when it is blocked, by virtue of the action of heat.

5. The apparatus as claimed in claim 4, wherein the anti-icing unblocking unit comprises heating elements that release the blocked air guide by virtue of a heating-up process.

6. The apparatus as claimed in claim 5, wherein the heating elements are integrated into the air guide.

7. The apparatus as claimed in claim 6, wherein the heating elements are designed as electrical heating elements.

8. The apparatus as claimed in claim 5, wherein the heating elements are designed as heating ducts through which a heating agent, which is preferably heated by the vehicle component of which the temperature is to be controlled, flows.

9. The apparatus as claimed in claim 5, wherein an air stream heated by the component of which the temperature is to be controlled, is blown to the air guide by a fan in order to deice said air guide.

10. The apparatus as claimed in claim 1, wherein a blocking detection sensor for detecting a blocked state of the air guide is provided, wherein said blocking detection sensor is a torque sensor, and wherein a control device is configured so that the air guide is cyclically tested to check for a blocking state, preferably only below a temperature threshold value, by being opened and closed by an actuator in order to detect a blocking state of the air guide, and wherein the cooling apparatus is a liquid radiator, and the vehicle component to be cooled is an internal combustion engine of a motor vehicle.

11. An apparatus adapted for controlling a temperature of a vehicle component, comprising:
a displaceable air guide configured to control a cooling air stream;
an actuator configured to displace said displaceable air guide; and
an anti-icing unblocking unit adapted to melt ice and snow and unblock the displaceable air guide.

12. The apparatus of claim 11, further including a control unit configured to control operation of said anti-icing unblocking unit.

13. The apparatus of claim 12, further including a blocking detection sensor adapted for sensing when said displaceable air guide is blocked from displacement by ice and snow, said blocking detection sensor being connected to the control unit.

14. The apparatus of claim 13, further including a temperature sensor adapted for measuring external temperature, said temperature sensor being connected to the control unit.

15. The apparatus of claim 14, wherein the control unit is configured for comparison of the external temperature measured by the temperature sensor with an external temperature threshold value for providing a frost warning.

16. The apparatus of claim 15, wherein the control unit is configured for testing the air guide for a blocking state by displacing said air guide between an open position and a closed position when the external temperature is below the external temperature threshold value.

17. The apparatus of claim 16, wherein said blocking detection sensor is a torque sensor.

18. The apparatus of claim 17, wherein said anti-icing unblocking unit includes a pump and at least one nozzle for directing a frost protection agent onto said displaceable air guide to melt ice and snow and unblock said displaceable air guide.

19. The apparatus of claim 17, wherein said anti-icing unblocking unit includes an electrical heating element integrated into said displaceable air guide.

20. The apparatus of claim 17, wherein said anti-icing unblocking unit includes a heating duct carried on said displaceable air guide and a heating agent flowing through said heating duct.

\* \* \* \* \*